Patented Oct. 13, 1953

2,655,495

UNITED STATES PATENT OFFICE 2,655,495

ARSENITE CATALYST ACTIVATOR

Harry Leverne Williams, Sarnia, Ontario, Canada, assignor to Polymer Corporation Limited, Sarnia, Ontario, Canada, a corporation of Canada No Drawing. Application January 19, 1951, Serial No. 206,940

14 Claims. (Cl. 260—82.5)

This invention relates generally to the catalyzing of free radical initiated polymerization systems by metal complexes. More particularly it relates to catalyst activation of peroxy induced free radical polymerization systems by a complex composed of ferrous iron, a heavy metal sequestering agent such as pyrophosphate or ethylene dinitrilo tetra acetic acid, and arsenious oxide.

In the customary method of polymerizing conjugated dienes such as butadiene, isoprene, dimethylbutadiene, chloroprene, methyl pentadiene, and others with or without vinyl compounds such as styrene, acrylonitrile, methyl methacrylate or similar compounds, the monomers are reacted in aqueous emulsion in the presence of emulsifiers, catalysts, modifiers or regulators, activators, promoters and other suitable additives. In the temperature range 30° C. to 70° C. the reaction proceeds at rates which are practical for commercial production when such well known initiators as potassium persulfate, hydrogen peroxide and other peroxy compounds are used. It is the general feeling in the art, however, that superior polymerization products are to be obtained by carrying out the reaction at much lower temperatures. At these lower temperatures the effectiveness of the generally accepted catalysts such as persulfates, hydrogen peroxide, and organic peroxides and hydroperoxides is markedly reduced so that the reaction time to a practical degree of hydrocarbon conversion may be many days or weeks. The use of certain heavy metal inorganic complexes has been found to restore the effectiveness of the catalysts or initiators to the point where the rate of reaction at the lower temperatures is comparable with that experienced at high temperatures without the use of such complexes.

Ferrous pyrophosphate has been favored among the known activators. For optimal results it may be necessary to dissolve separately one or both of the components used in its preparation and to add one to the other in a particular manner and at a definite rate. A suspension of the relatively insoluble pyrophosphate varying from a thick paste to a faintly milky solution is thus achieved. This may require aging at elevated temperatures for optimal activity or to overcome a slow natural aging at room temperature whereby the qualities of the activator change markedly with time. My copending application No. 99,346, filed June 15, 1949, shows how these disadvantages may be overcome by the use of organic chelate complex forming compounds either alone, in combination with ferrous sulfate or in combination with ferrous pyrophosphate. Important among such organic chelate complex forming compounds is ethylene dinitrilo tetra acetic acid. While such activators are successfully employed in the customary recipe at 5° C. to achieve a rate of reaction which is suitable for commercial operations, the rate of reaction becomes progressively slower as reaction temperatures are reduced and increased quantities are required.

It is the object of this invention to overcome these disadvantages and to maintain a satisfactory rate of reaction at temperatures as low as −18° C. without materially increasing the quantities of iron or of chelating complex employed in the reaction.

It has been found that the addition of soluble arsenites to ferrous pyrophosphate and organic chelate complex containing activators has a very surprising accelerating effect on such peroxy initiated reactions.

Sodium and potassium arsenite are preferred as additives as they are soluble and do not add to the polymerization system ions which are insoluble or poorly dispersed in the emulsion. It is believed that the addition of copper or manganese arsenites would be undesirable as residual copper or manganese is suspected of being the cause of rapid aging of the resulting polymer. A water soluble arsenite can conveniently be obtained by dissolving arsenious oxide in the alkaline medium.

These activators and such additives as are above set out are considered to function only by increasing the rate of decomposition of the peroxy initiator to yield free radicals. It is therefore to be expected that with suitable adjustments as to quantity of activator and the additives herein disclosed the invention is applicable to peroxy initiators generally and not merely to those employed in the examples to be cited below. Further, it is not considered that there is any evidence in the theory of action of the initiator system which would restrict the use of such peroxy initiator, activator or compounds herein disclosed as additives to any monomer type, emulsifier type, modifier or other ingredient in the polymerization recipe not directly related to the initiator system. Finally, it is not considered essential that the sodium or potassium arsenite present in the reaction be achieved only through the introduction of arsenious oxide although this is a convenient means of addition.

*Example I*

The invention may be practiced in conjunction with the following generally accepted recipe or other recipes based on the same type of initiator system.

| | Parts by weight |
|---|---|
| Butadiene | 71 |
| Styrene | 29 |
| Water | 180 |
| Methanol | 40 |
| Hydrogenated rosin acid soap | 5.0 |
| Cumene hydroperoxide | .17 |
| Mixed tertiary mercaptan | .12 |

The procedure followed was to charge the soap-water-methanol masterbatch after adjusting to pH 10. The styrene-mixed tertiary mercaptan masterbatch was added and then the butadiene. At this point, the bottle was securely capped and the contents cooled to the reaction temperature. The cumene hydroperoxide mixed with some of the styrene was then injected. The normal practice is then to add the activator after it has been precooled to the reaction temperature. The activators added to various charges comprised 0.31 pt. $FeSO_4.7H_2O$, 0.51 pt. of $Na_4P_2O_7$ and 0.14 pt. of the inorganic substance indicated in the following table. The conversions achieved in each case are shown.

| Inorganic substance | Conversion after 17 hrs. at $-10°$ C. |
|---|---|
| | Percent |
| None | 40 |
| Sodium sulfite | 47 |
| Rochelle salt | 47 |
| Sodium hypophosphite ($NaH_2PO_2.H_2O$) | 57 |
| $K_2SO_4$ | 58 |
| $Na_2P_2O_3.5H_2O$ | 58 |
| $As_2O_3$ | 62 |

The addition of electrolytes is common practice where they tend to increase the rate of conversion of hydrocarbon to polymer and to render the latex more fluid for heat transfer. The arsenious oxide, however, is not performing the function of an electrolyte but is rather exerting a modifying effect on the activator as the following example illustrates.

*Example II*

The following ingredients were charged in accordance with the procedure outlined in Example I:

| | Parts by weight |
|---|---|
| Butadiene | 71 |
| Styrene | 29 |
| Water | 180 |
| Methanol | 37 |
| Potash soap of hydrogenated fatty acids | 4.6 |
| Dispersing agent | .02 |
| Mixed tertiary mercaptan | .24 |
| Isopropyl cumene hydroperoxide | .2 |

The activator was prepared by aging together $FeSO_4.7H_2O$ (0.31 pt.) and either or both potassium pyrophosphate (0.55 pt.) and arsenious oxide (0.07 pt.). The activator was protected from oxygen, precooled and added to the charge. The reaction was allowed to continue for 17 hrs. @ $-10°$ C. The results were as follows:

| Activator | Percent conversion |
|---|---|
| (a) $FeSO_4.7H_2O$ and $K_4P_2O_7$ | 38.9 |
| (b) $FeSO_4.7H_2O$ and $As_2O_3$ and $K_4P_2O_7$ | 86.8 |
| (c) $FeSO_4.7H_2O$ and $As_2O_3$ | 5.8 |

This example demonstrates the remarkable enhancing effect of a small amount of $As_2O_3$. If the $As_2O_3$ is not added to the activator until after the aging step some benefit is realized but it is greatly reduced. If 0.15 parts $As_2O_3$ (more than twice the quantity used in (b) or (c)) are added to an activator such as (a) above after it has been aged, the conversion realized is 51%. The amazing difference between adding the $As_2O_3$ before aging and after aging suggests that it is exerting a modifying influence on the structure of the activator rather than acting as an electrolyte.

*Example III*

The following charge was prepared in the manner previously outlined:

| | Parts |
|---|---|
| Butadiene | 71 |
| Styrene | 29 |
| Water | 130 |
| Methanol | 46 |
| Potash soap of H.F.A | 4.6 |
| Mixed tertiary mercaptan | .24 |
| Isopropyl cumene hydroperoxide | .15 |

An activator comprising $FeSO_4.7H_2O$ (0.155 pt.) and either or both of $K_4P_2O_7$ (0.140 pt.) and $As_2O_3$ (0.072 pt.–0.084 pt.) was prepared and injected in the maner previously outlined. The conversions achieved with the various reactions after 17 hrs. at $-18°$ C. were as follows:

| Activator composition | Percent conversion |
|---|---|
| $FeSO_4.7H_2O$ and $K_4P_2O_7$ | 3.7 |
| $FeSO_4.7H_2O$ and $K_4P_2O_7$ and $As_2O_3$ (0.084 pt.) | 25.6 |
| $FeSO_4.7H_2O$ and $As_2O_3$ (0.072 pt.) | .5 |

*Example IV*

The addition of arsenious oxide to the ferrous pyrophosphate type of activator enhances the effectiveness of the activator as illustrated in Examples I, II and III.

It has also been found arsenious oxide additions can be advantageously made to activators of the organic chelate complex type. The increased conversion obtained when arsenious oxide additions are made to this type of activator are thought to be partly due to the effect of the organic chelate complex and partly due to the arsenious oxide.

To charges as prepared in Example III various activators were added as indicated in the following schedule and the conversion data achieved after reacting for 17 hrs. @ $-18°$ C. are set out. The activators in each case contained 0.15 parts of $FeSO_4.7H_2O$ and those containing $K_4P_2O_7$ were aged while the one containing only ethylene dinitrilo tetra acetic acid was not.

| $K_2P_2O_7$ | Ethylene dinitrilo tetra acetic acid | $As_2O_3$ | Percent conversion |
|---|---|---|---|
| 0.14 | 0 | 0 | 15 |
| 0 | .20 | 0 | 6 |
| .112 | .04 | 0 | 21 |
| .14 | 0 | .084 | 26 |
| .056 | .12 | .034 | 44.1 |

The purpose of this example is to show the small effect exercised by varying the amount of arsenious oxide added to ferrous pyrophosphate type activators.

To the charge disclosed in Example III were added the same activators in the same amounts with the exception that the amount of arsenious oxide was varied. The results obtained are set out below:

| Parts arsenious oxide | Percent conversion in 17 hrs. at −18° C |
| --- | --- |
| 0 | 3.7 |
| 0.024 | 15.0 |
| 0.060 | 21.0 |
| 0.072 | 23.4 |
| 0.084 | 25.6 |
| 0.096 | 24.1 |

While it is evident that quantities from 0.060 to 0.096 and perhaps higher are quite effective it is desirable to use the minimal quantity to yield a satisfactory rate, hence 0.084 was chosen as representing a value near the optimal.

While the data contained in the above examples demonstrates the remarkable enhancing effect $As_2O_3$ has on the activator it does not purport to cover the full range of possibilities. By modifications generally practised in the art such as increased emulsifiers, or mixtures thereof, and the employment of more active peroxides in the formula, a hydrocarbon conversion of 60% in 17 hrs. @ −18° C. can readily be achieved. Such conversions are, of course, entirely practical for commercial operations.

I claim:

1. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous sulfate, an alkali metal pyrophosphate and a soluble organic chelate complex of an organic compound selected from the group consisting of compounds of the general formula

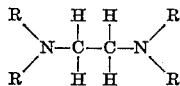

and water soluble salts thereof, R being an alkyl carboxyl group, the step of incorporating in the charge a small amount of a soluble arsenite in activating quantities.

2. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous sulfate, an alkali metal pyrophosphate and ethylene dinitrilo tetraacetate, the step of incorporating in the charge a small amount of a soluble arsenite in activating quantities.

3. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous sulfate and an alkali metal pyrophosphate, the step of incorporating in the charge a small amount of a soluble arsenite in activating quantities.

4. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator a heavy metal pyrophosphate, the step of incorporating in the charge a small amount of a soluble arsenite in activating quantities.

5. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator a heavy metal pyrophosphate and a soluble organic chelate complex of an organic compound selected from the group consisting of compounds of the general formula

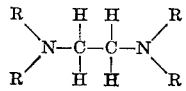

and water soluble salts thereof, R being an alkyl carboxyl group, the step of incorporating in the charge a small amount of a soluble arsenite corresponding to about 0.024 to 0.15 part by weight of $As_2O_3$ to 100 parts by weight of monomers.

6. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous pyrophosphate, the step of incorporating in the charge a small amount of a soluble arsenite corresponding to about 0.024 to 0.15 parts by weight of $As_2O_3$ to 100 parts by weight of monomers.

7. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous sulfate, an alkali metal pyrophosphate and a soluble organic chelate complex of an organic compound selected from the group consisting of compounds of the general formula

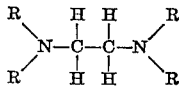

and water soluble salts thereof, R being an alkyl carboxyl group, the step of incorporating in the charge a small amount of a soluble alkali metal arsenite corresponding to about 0.024 to 0.15 parts by weight of $As_2O_3$ to 100 parts by weight of monomers.

8. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator a heavy metal pyrophosphate and a soluble organic chelate complex of an organic compound selected from the group consisting of compounds of the general formula

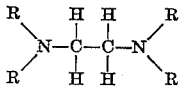

and water soluble salts thereof, R being an alkyl carboxyl group, the step of incorporating in the charge a small amount of a soluble alkali metal arsenite corresponding to about 0.024 to 0.15 parts by weight of $As_2O_3$ to 100 parts by weight of monomers.

9. In the process which comprises causing substances selected from the group consisting of butadiene-1,3 and admixtures thereof with copolymerizable compounds to polymerize in aqueous emulsions at low temperatures in the presence of a peroxy type catalyst while employing as a catalytic activator ferrous pyrophosphate, the step of incorporating in the charge a small amount of a soluble alkali metal arsenite corresponding to about 0.024 to 0.15 parts by weight of $As_2O_3$ to 100 parts by weight of monomers.

10. In the process which comprises causing substances selected from the group consisting of butadiene 1,3 and admixtures thereof with copolymerizable compounds to polymerize in aqueous emulsions at low temperatures in the presence of a peroxy type catalyst while employing as a catalytic activator a heavy metal pyrophosphate and a soluble organic chelate complex of ethylene dinitrilo tetra-acetic acid and soluble salts thereof, the step of incorporating in the charge a small amount of a soluble arsenite corresponding to about 0.024 to 0.15 parts by weight of $As_2O_3$ to 100 parts by weight of monomers.

11. In the process which comprises causing substances selected from the group consisting of butadiene 1,3 and admixtures thereof with copolymerizable compounds to polymerize in aqueous emulsions at low temperatures in the presence of a peroxy type catalyst while employing as a catalytic activator a heavy metal pyrophosphate and a soluble organic chelate complex of ethylene dinitrilo tetra-acetic acid and soluble salts thereof, the step of incorporating in the charge a small amount of a soluble alkali metal arsenite corresponding to about 0.024 to 0.15 parts by weight of $As_2O_3$ to 100 parts by weight of monomers.

12. In the process which comprises causing substances selected from the group consisting of butadiene 1,3 and admixtures thereof with copolymerizable compounds to polymerize in aqueous emulsions at low temperatures in the presence of a peroxy type catalyst while employing as a catalytic activator a heavy metal sulfate, an alkali metal pyrophosphate and a soluble organic chelate complex of ethylene dinitrilo tetra-acetic acid and soluble salts thereof, the step of adding to the charge a small amount of arsenious oxide thereby forming an arsenite in activating quantities.

13. In the process which comprises causing substances selected from the group consisting of butadiene 1,3 and admixtures thereof with copolymerizable compounds to polymerize in aqueous emulsions at low temperatures in the presence of a peroxy type catalyst while employing as a catalytic activator a heavy metal sulfate and an alkali metal pyrophosphate the step of adding to the charge a small amount of arsenious oxide thereby forming an arsenite in activating quantities.

14. In the process which comprises causing substances selected from the group consisting of butadiene 1,3 and admixtures thereof with copolymerizable compounds to polymerize in aqueous emulsions at low temperatures in the presence of a peroxy type catalyst while employing as a catalytic activator ferrous sulfate, an alkali metal pyrophosphate and a soluble organic chelate complex of ethylene dinitrilo tetra-acetic acid and soluble salts thereof, the step of adding to the charge a small amount of arsenious oxide thereby forming an arsenite in activating quantities.

HARRY LEVERNE WILLIAMS.

No references cited.